March 21, 1933.  P. KILIMNIK  1,902,082
TUBE PROTECTOR
Filed Jan. 10, 1930   2 Sheets-Sheet 1
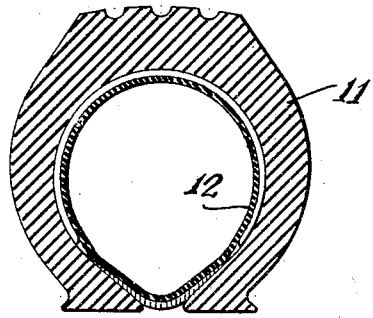
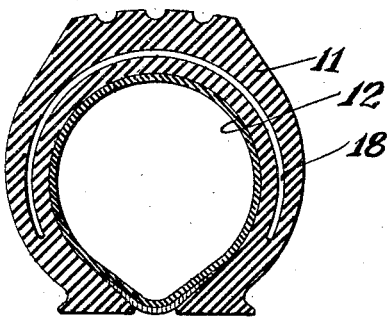
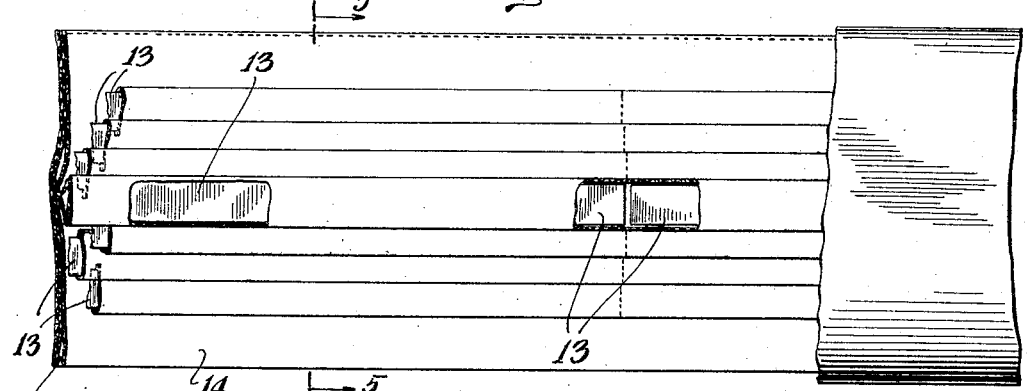
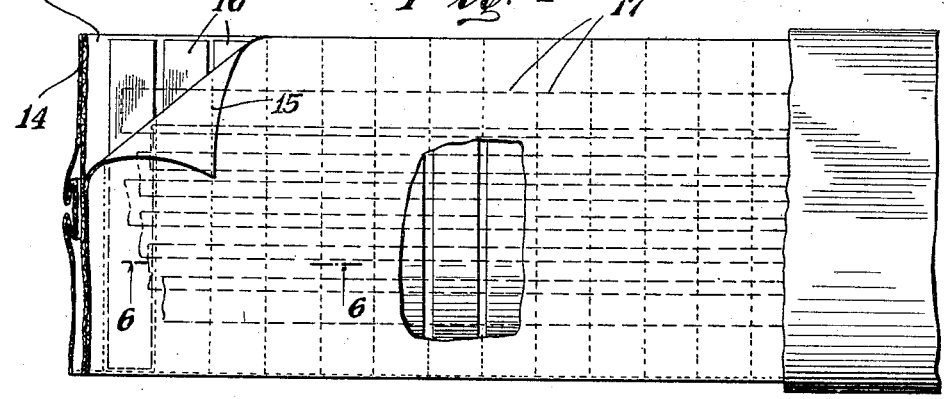
Philip Kilimnik
INVENTOR
BY Victor J. Evans
ATTORNEY

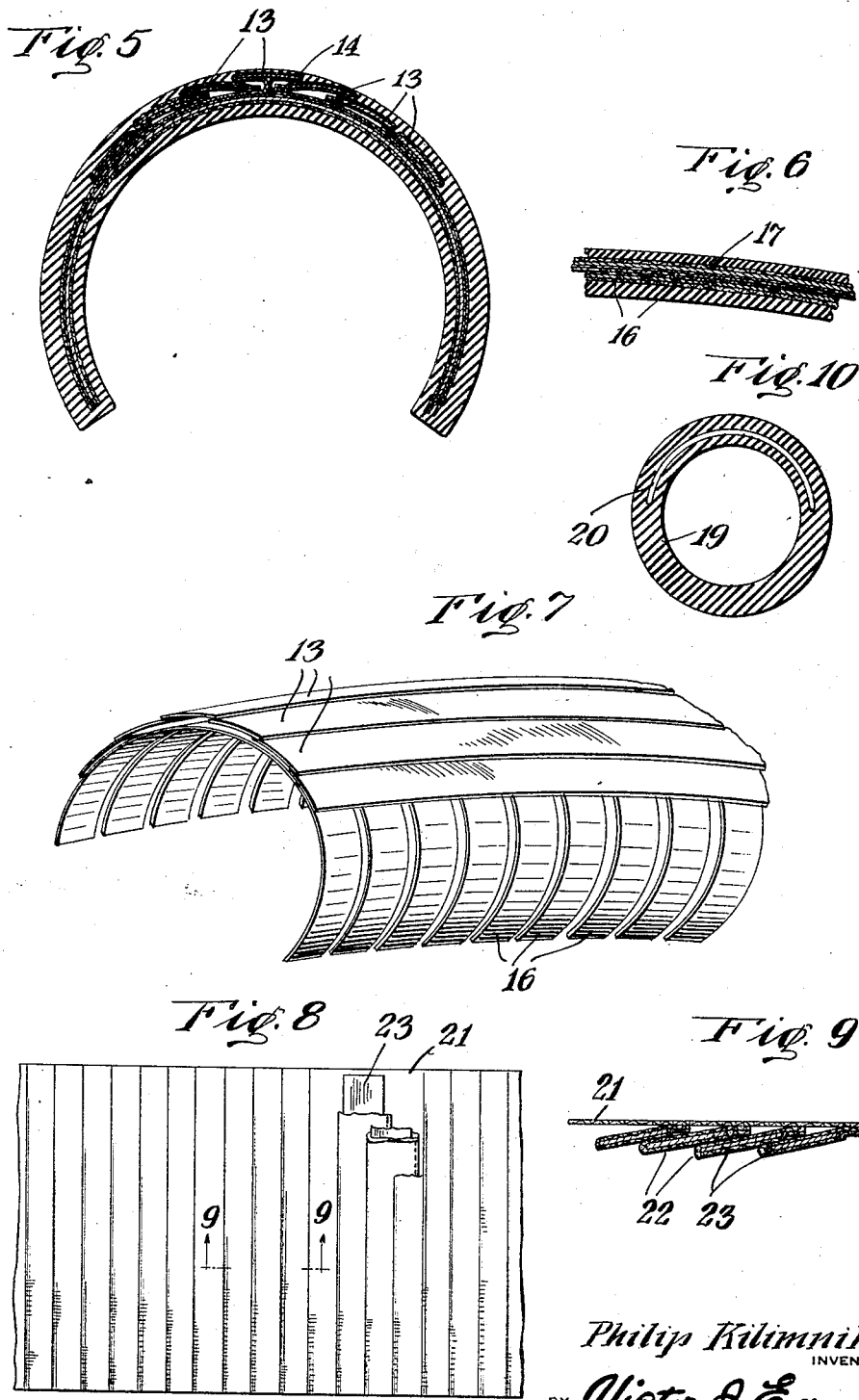

Patented Mar. 21, 1933

1,902,082

UNITED STATES PATENT OFFICE

PHILIP KILIMNIK, OF MIDDLE VILLAGE, NEW YORK

TUBE PROTECTOR

Application filed January 10, 1930. Serial No. 419,951.

This invention relates to pneumatic tires in general and particularly to protective devices or armor wherewith the air carrying tube is protected against puncture.

The broad object of the present invention is to provide an improved protective means comprising an armor for a pneumatic tire of the single tube type or of the double tube type, in which means are provided for protecting the air carrying tube against puncture without interfering materially with the resilient action of the tire.

Another object of the invention is to provide armor or protective means for pneumatic tires which comprises lateral and circumferential elastic metal strips assembled in such a manner as to produce an annular protecting band partially enclosing the central air passage of the tire.

Another object is to provide means integral with the outer casing of a pneumatic tire for the purpose of making it resistent to puncture.

A further object is to provide a protector or liner for the casing of a double tube tire for the purpose of preventing the inner tube from being punctured.

A still further object is to provide means for reinforcing a single tube tire to prevent piercing of the tire by foreign objects such as nails or tacks.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In said drawings:

Fig. 1 is a transverse section through a vehicle tire of the double tube type and illustrates diagrammatically the mode of application of the protector or liner.

Fig. 2 is a section similar to Fig. 1 illustrating a modification in which the reinforcing or armor is incorporated in the outer tube or casing of a double tube tire.

Fig. 3 is a plan view with parts broken away of the outer surface of a vehicle tire embodying the present invention.

Fig. 4 is a dissected view of a portion of the fabric support showing the arrangement of the lateral reinforcing strips.

Fig. 5 is a transverse section on the line 5—5 of Fig. 3.

Fig. 6 is a section taken on the line 6—6 of Fig. 4.

Fig. 7 is a skeletonized view showing the relative positions of the circumferential and lateral metallic reinforcing strips respectively.

Fig. 8 is a plan view illustrating a modification of the construction illustrated in Figs. 3 to 7 respectively, the construction having been modified to adapt the protector for use in connection with a balloon tire.

Fig. 9 is a section taken on the line 9—9 of Fig. 8.

Fig. 10 is a transverse section of a single tube type of tire such as is commonly used on bicycles and illustrates a modification in construction in order to adapt the reinforcing means to a tire of the type just mentioned.

The numeral 11, Fig. 1, represents the outer tube or casing of a double tube tire which is commonly termed the "shoe", while the numeral 12 represents the inner tube of such a tire. These elements are of well known construction and need not be described more fully herein. The white space between the shoe 11 and the inner tube 12 in Fig. 1 indicates diagrammatically the position occupied by the protector or liner now to be described. The numerals 13 represent circumferential metallic reinforcing strips which are sewed within circumferential pockets in a fabric structure.

It will be noted from an inspection of Figs. 3, 5 and 7 that a plurality of strips 13 are provided and are adapted to overlap substantially. The central strip 13 is carried within a pocket formed by folding and stitching a fabric structure 14 formed of a material such as strong canvas while the adjacent strips 13 are contained within pockets formed of a strip of fabric folded about the reinforcing strips and stitched to the fabric structure 14 by a line of stitches which underlie the next adjacent strip. This construction is very clearly indicated in Figs. 3 and 5 particularly.

In Fig. 5 the central strip 13 is shown overlapping the line of stitches by means of which the adjacent pockets containing the strips 13 are fastened to the fabric structure 14 while the pockets containing the more remote strips 13 are stitched with a line of stitches underlying the free edges of the members 13 which are relatively nearer the central strip. The central strip 13 may be substantially flat, if desired, however, the more remote strips must be substantially frusto conical surfaces in order for them to conform more nearly to the inner surface of the shoe. It will be observed that the pocket containing the central strip Fig. 5 is formed by folding a wide strip of fabric in the middle and stitching a line of stitches a sufficient distance from the edge of the fold to permit insertion of the reinforcing strip. The pocket thus formed is flattened out substantially before inserting the reinforcing strip so that when the strip is inserted the line of stitches will be centrally placed and underlie the center line of the central strip. The remaining material of the fabric structure 14 is formed so as to be spread out to adapt itself to the contour of the inner tube of the tire and, as explained before, the pockets containing the adjacent reinforcing strips are so sewed to the structure 14 that each line of stitches underlies the edges of the strips which are relatively nearer the central strip. The entire structure comprising the fabric sheet surface 14 together with the strips 13 and their associated pockets comprises the outer protective surface. The fabric structure 14 together with its associated strips 13 is wide enough to enclose and protect the greater part of the outer surface of the tube.

The fabric structure 14 completely overlies a second fabric surface or base which is composed of a sheet of fabric 15. The base fabric 15 is preferably composed of two layers of fabric between which are laid lateral strips of metal reinforcing members or strips 16 curved to the contour of the tire. The members 16 are held in place between the two layers of fabric 15 by means of parallel rows of stitches 17 between the lateral strips.

The protector or liner as a whole is composed of an assembled fabric structure 14 with its associated circumferential reinforcing strips 13 together with the assembled base comprising the fabric layers 15 and its lateral reinforcing strips. The assembled layers of fabric 14 and 15 are stitched together along the edges of the fabric so that the circumferential strips 13 are on the outside. After being stitched together circumferentially the whole assembly of fabric structures 14 and 15 and reinforcing strips 13 and 16 are incased in a sheathing of vulcanized rubber ready for use. Figure 5 illustrates a section through the assembled protector or liner and clearly shows the relationship between the various layers of fabric. The fabric base comprising the layers of fabric 15 might be composed of one sheet of fabric folded along the middle of its length and stitched with only one stitch before being assembled with the fabric structure 14, or, if desired, it may be stitched laterally, the members 16 inserted and the whole stitched to the fabric structure 14 by means of circumferential stitches along the edges of the layers 14 and 15.

It may be found desirable to incorporate the protector or liner in a tire shoe. In such cases the entire assembled fabric structure including the associated reinforcing strips 13 and 16 may be vulcanized as a unit within the shoe as indicated diagrammatically in Fig. 2 in which the blank space 18 shows the position occupied by the protector.

In Fig. 10 there is shown diagrammatically a protector similar to the one just described incorporated in a bicycle type of tire 19, the blank space 20 indicating the position occupied by the protector. When used in such a tire the protector is vulcanized in the tread as indicated.

Figures 8 and 9 illustrate an embodiment of the protector or liner which is modified for use with balloon type tires. The modification consists of a circumferential fabric strip 21 to which are sewed lateral pockets 22. Suitable metallic reinforcing strips 23 are carried within the pockets 22 and the pockets are so positioned on the surface of the fabric strip 21 that the metallic members overlap each other as indicated in Figure 9. The entire fabric strip 21 with the pockets 22 and metallic strips 23 may be vulcanized with a rubber sheath so as to form a continuous smooth surface externally on both sides. A protector or liner so formed is inserted in the shoe in the same manner as the liner or protector first described herein and illustrated in Figure 1, and occupies a position between the inside surface of the shoe and the outside surface of the inner tube. The liner when used in connection with a balloon type tire will, naturally enough, be much wider than a similar liner for an ordinary tire owing to the larger volume occupied by such tires.

The overlapping metal strips 13 or 23 form a protective armor which is proof against piercing by a nail or tack such as might be picked up by the tire shoe, while the lateral strips 16 incorporated in the form of liner first described give additional protection against puncture particularly along the sides of the tire. The metal strips are preferably formed of thin sheet steel which may or may not be tempered as desired. The fabric structures may be composed of any strong fabric such as canvas and assist materially in strengthening the liner or protector as a whole.

The hereinbefore described construction admits of considerable modification without departing from the invention; therefore, it is the desire not to be limited to the precise arrangements shown and described, which are as aforesaid, by way of illustration merely. In other words, the scope of protection contemplated is to be taken solely from the appended claim, interpreted as broadly as is consistent with the prior art.

What I claim as new is:

In a motor vehicle tire protector, a fabric member having a circumferential pleat therein to correspond with the center line of the tire and a plurality of pockets secured to said fabric member on opposite sides thereof, the adjacent pockets to said central pleat formed to extend under the said pleat and each pocket overlying an adjacent pocket away from the said central line of the tire to such an extent that strips of material in the pleat and pockets will extend under the strips of material in the preceding pleat and pockets and will extend substantially to the centers of said strips, and strips of substantially impenetrable material in said pleat and pockets, said protector adapted to be positioned in a motor vehicle tire between the inner tube and inner surface of the casing providing a continuous protecting element for said inner tube.

In testimony whereof I hereby affix my signature.

PHILIP KILIMNIK.